(12) United States Patent
Acuna

(10) Patent No.: US 11,023,843 B2
(45) Date of Patent: Jun. 1, 2021

(54) ACTIVITY TRACKER DATA TRANSFORMER

(71) Applicant: ADP, LLC, Roseland, NJ (US)

(72) Inventor: Brandon Acuna, Folson, CA (US)

(73) Assignee: ADP, LLC, Roaseland, NJ (US)

( * ) Notice: Subject to any disclaimer, the term of this patent is extended or adjusted under 35 U.S.C. 154(b) by 179 days.

(21) Appl. No.: 16/267,576

(22) Filed: Feb. 5, 2019

(65) Prior Publication Data

US 2020/0250607 A1  Aug. 6, 2020

(51) Int. Cl.
| | |
|---|---|
| G06Q 10/06 | (2012.01) |
| G06Q 10/10 | (2012.01) |
| G06F 3/01 | (2006.01) |

(52) U.S. Cl.
CPC ....... *G06Q 10/06393* (2013.01); *G06F 3/011* (2013.01); *G06F 3/017* (2013.01); *G06Q 10/105* (2013.01)

(58) Field of Classification Search
None
See application file for complete search history.

(56) References Cited

U.S. PATENT DOCUMENTS

| | | | | |
|---|---|---|---|---|
| 10,719,793 | B1 * | 7/2020 | Smith | G06N 7/08 |
| 2013/0274904 | A1 * | 10/2013 | Coza | A63B 71/0619 |
| | | | | 700/91 |
| 2014/0337186 | A1 * | 11/2014 | Sabarez, II | G06Q 30/018 |
| | | | | 705/28 |
| 2015/0012338 | A1 * | 1/2015 | Gonzalez | G06Q 10/06398 |
| | | | | 705/7.42 |
| 2018/0116560 | A1 * | 5/2018 | Quinn | A61B 5/6832 |
| 2018/0330306 | A1 * | 11/2018 | Shaw | H04W 4/029 |
| 2019/0050608 | A1 * | 2/2019 | Gonzalez | G06K 5/02 |
| 2019/0172002 | A1 * | 6/2019 | Zhang | G06F 1/163 |

(Continued)

OTHER PUBLICATIONS

Jayden Khakurel, Helinä Melkas and Jah Porras. Tapping into the wearable device revolution in the work environment: a systematic review. Information Technology & People, vol. 31 No. 3, 2018, pp. 791-818. Emerald Publishing Limited, DOI 10.1108/ITP-03-2017-0076.*

(Continued)

*Primary Examiner* — Eric W Stamber
*Assistant Examiner* — George H Walker, III
(74) *Attorney, Agent, or Firm* — Patrick J. Daugherty; Daugherty & Del Zoppo Co., LPA

(57) ABSTRACT

Aspects estimate attributes of physical movement of a user from motion data acquired from a unique activity tracker deployed and operational on the user while the user is proximate to a work-piece receptacle; compare the estimated physical movement attributes to a knowledge base plurality of discrete data sets of motion attribute value that are labeled with specific physical movements; identify portions of the estimated physical movement attributes that match labeled knowledge base data sets associated to execution of a defined work unit associated to a work-piece receptacle during a defined working time period; in response to notice of completion of a work unit, and credit the user with a compensation value of for completion of the work unit in response to verifying that an aggregation of the portions matches a threshold requirement for indication of completion of work unit.

11 Claims, 3 Drawing Sheets

(56) References Cited

U.S. PATENT DOCUMENTS

2019/0343429 A1* 11/2019 Elhawary ............... A61B 5/746
2020/0013038 A1* 1/2020 Kurata ............... G06Q 20/3223

OTHER PUBLICATIONS

Tokihiro Fukatsu and Teruaki Nanseki. Monitoring System for Farming Operations with Wearable Devices Utilized Sensor Networks. Sensors 2009, 9, 6171-6184; doi: 10.3390/s90806171.*

* cited by examiner

ACTIVITY TRACKER DATA TRANSFORMER

BACKGROUND

The field of Human Capital Management (HCM) includes payroll tax notice processing from various taxing agencies concerning payroll taxes owed by a taxed entity, such as a company or organization.

Human resource management (sometimes "HRM" or "HR") generally refers to functions and systems deployed in organizations that are designed to facilitate or improve employee, member or participant performance in service of an organization or employer's strategic objectives. HR comprehends how people are identified, categorized and managed within organizations via a variety of policies and systems. Human Resources management systems may span different organization departments and units with distinguished activity responsibilities: examples include employee retention, recruitment, training and development, performance appraisal, managing pay and benefits, and observing and defining regulations arising from collective bargaining and governmental laws. Human Resources Information Systems (HRIS) comprehend information technology (IT) systems and processes configured and utilized in the service of HR, and HR data processing systems which integrate and manage information from a variety of different applications and databases.

SUMMARY

In one aspect of the present invention, a method includes a processor determining that a unique activity tracker is deployed and operational on a user while the user is proximate to a work-piece receptacle during a defined working time period; estimating attributes of physical movement of the user from motion data acquired from the activity tracker while the user is proximate to the work-piece receptacle during the defined working time period; comparing the estimated physical movement attributes to a knowledge base plurality of discrete data sets of motion attribute value that are labeled with specific physical movements; identifying each of a plurality of discrete portions of the estimated physical movement attributes that match ones of the labeled data sets within the knowledge base that are associated to execution of a defined work unit that is associated to the work-piece receptacle during the defined working time period; in response to a notice of completion of the work unit by the user during the working time period, verifying whether an aggregation of the plurality of discrete portions of the estimated physical movement attributes meets a threshold requirement for indication of completion of work unit; and crediting the user with a compensation value of for completion of the work unit in response to verifying that the aggregation of the plurality of discrete portions of the estimated physical movement attributes matches the threshold requirement for indication of completion of work unit.

In another aspect, a system has a hardware processor in circuit communication with a computer readable memory and a computer-readable storage medium having program instructions stored thereon. The processor executes the program instructions stored on the computer-readable storage medium via the computer readable memory and thereby determine that a unique activity tracker is deployed and operational on a user while the user is proximate to a work-piece receptacle during a defined working time period; estimate attributes of physical movement of the user from motion data acquired from the activity tracker while the user is proximate to the work-piece receptacle during the defined working time period; compare the estimated physical movement attributes to a knowledge base plurality of discrete data sets of motion attribute value that are labeled with specific physical movements; identify each of a plurality of discrete portions of the estimated physical movement attributes that match ones of the labeled data sets within the knowledge base that are associated to execution of a defined work unit that is associated to the work-piece receptacle during the defined working time period; in response to a notice of completion of the work unit by the user during the working time period, verify whether an aggregation of the plurality of discrete portions of the estimated physical movement attributes meets a threshold requirement for indication of completion of work unit; and credit the user with a compensation value of for completion of the work unit in response to verifying that the aggregation of the plurality of discrete portions of the estimated physical movement attributes matches the threshold requirement for indication of completion of work unit.

In another aspect, a computer program product has a computer-readable storage medium with computer readable program code embodied therewith. The computer readable program code includes instructions for execution which cause the processor to determine that a unique activity tracker is deployed and operational on a user while the user is proximate to a work-piece receptacle during a defined working time period; estimate attributes of physical movement of the user from motion data acquired from the activity tracker while the user is proximate to the work-piece receptacle during the defined working time period; compare the estimated physical movement attributes to a knowledge base plurality of discrete data sets of motion attribute value that are labeled with specific physical movements; identify each of a plurality of discrete portions of the estimated physical movement attributes that match ones of the labeled data sets within the knowledge base that are associated to execution of a defined work unit that is associated to the work-piece receptacle during the defined working time period; in response to a notice of completion of the work unit by the user during the working time period, verify whether an aggregation of the plurality of discrete portions of the estimated physical movement attributes meets a threshold requirement for indication of completion of work unit; and credit the user with a compensation value of for completion of the work unit in response to verifying that the aggregation of the plurality of discrete portions of the estimated physical movement attributes matches the threshold requirement for indication of completion of work unit.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

"Activity trackers" refers to programmable or data acquisition devices worn or otherwise utilized to monitor and record data representative of a person's physical motions and activity. They are conventionally integrated into wearable apparel or personal accessories to acquire monitor data and biometric data from a user that is processed to identify the occurrence or absence of defined, discrete fitness and health data events, including discrete steps, user stride lengths, distances travelled, rate of travel, respiration events and rate, pulse rate, volume and force, ambient and body temperature, etc.

The acquired activity tracker data is conventionally processed to determine qualities of the monitored activities in meeting fitness or health metrics, for example, to estimate caloric energy expenditure totals or rate as a function of user body dimensions and age demographics or amounts or rates of recognized physical activities (steps taken, or number or rate of running strides, respiration and pulse and other vital sign metrics etc.). The processed event data may then be compared to fitness and health standards to monitor compliance with recommended or required exercise and health guidelines: for example, to confirm that a recommended daily amount of physical or aerobic activity has been performed.

Figure 1:
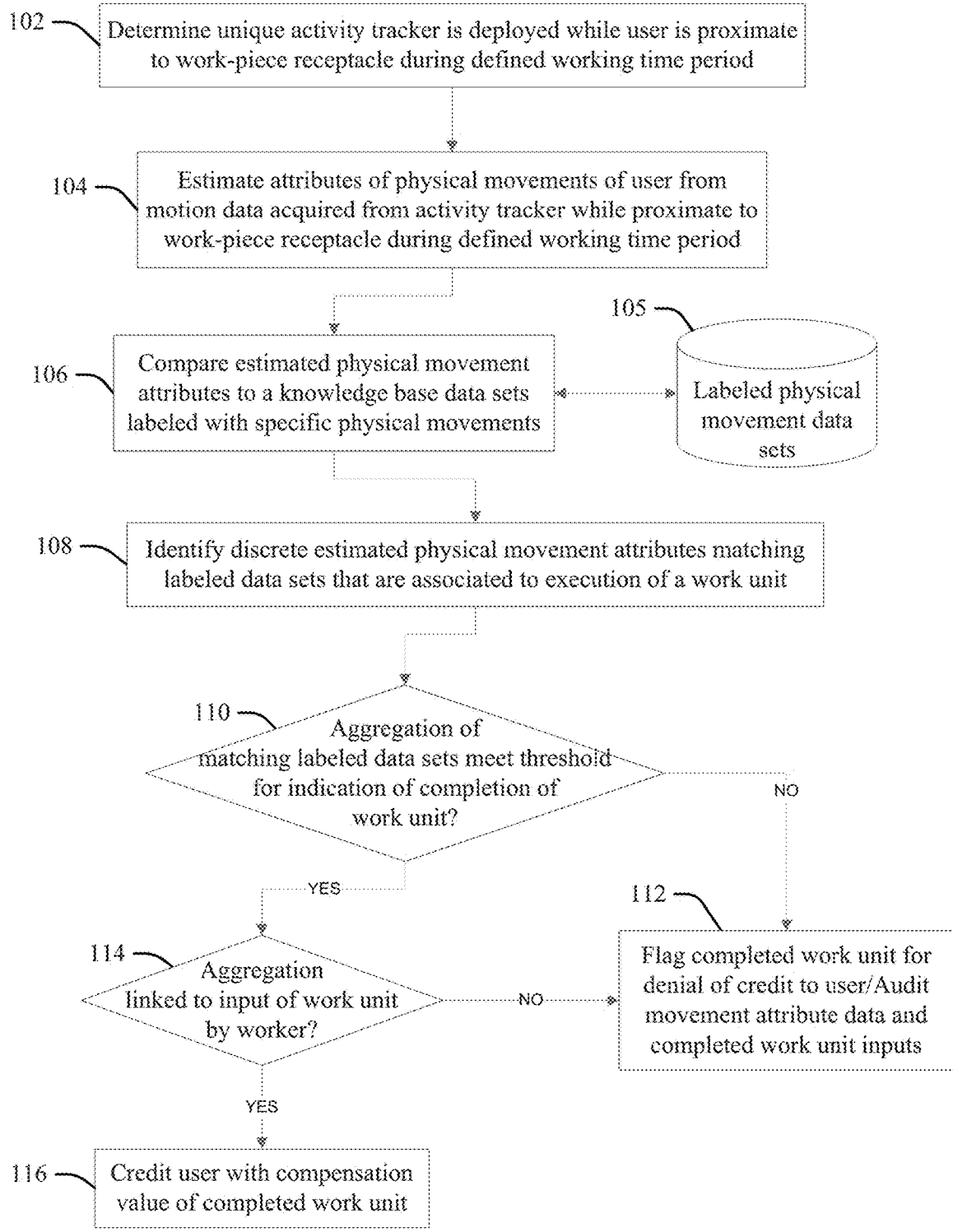
FIG. 1 is a flow chart illustration of a method or process aspect according to the present invention.

FIG. 1 illustrates a method or process embodiment of the present invention. At 102 a processor configured according to the present invention (the "configured processor") registers or otherwise determines that a unique activity tracker is operational on a user while the user is proximate to a workpiece receptacle during a defined working time period. The configured processor may make the determination at 102 in response to an affirmative or active input from the user: for example, pushing a button or icon to submit a "checking in," "on duty" or "engaged in loading activity" input linked to a unique identity indicia of the user and/or the activity tracker during a time period recognized as within a work day of an organization retaining the user as a worker, employee, independent contractor, etc. The configured processor may make the determination at 102 in response to passive or automatic inputs, for example, determining that the activity tracker provides a unique identity indicia to a receiving unit during a work day time period (not after-hours or during a lunch or other defined non-working or break time) while within a threshold distance proximity to a workpiece receptacle apparatus.

At 104 the configured processor estimates or otherwise determines attributes of physical movements of the user from motion data acquired from the activity tracker while the user is proximate to the work-piece receptacle during the defined working time period. Illustrative but not exhaustive examples of the estimated physical movements attributes include geospatial locations of the user and/or specific body portions thereof (hands, feet, arms, legs, etc.), directions of movement, range of motion, and motion initiation and termination locations.

At 106 the configured processor compares the estimated physical movement attributes to a knowledge base 105 that includes a plurality of discrete data sets of motion attribute value that are labeled with specific physical movements.

At 108 the configured processor identifies each of plurality of discrete portions of the estimated physical movement attributes that match labeled data sets within the knowledge base that are associated to execution of a work unit that is associated to the work-piece receptacle during the defined working time period.

At 110, in response to notice of completion of a unit of work by the user during the working time period, the configured processor verifies a total or other combination or aggregation of the matching labeled data sets meets a threshold for indication of completion of work unit: if not ("NO"), at 112 the configured processor flags the completed work unit for denial of credit to the user, and embodiments may further audit movement attribute data for further processing or consideration by a human resources or other management process (thus, to correct attribution of motion data where warranted).

If the configured processor verifies that the aggregation of the matching labeled data sets meets the threshold for indication of completion of work unit at 110 ("YES"), then at 114 the configured processor determines whether the aggregation is linked to (associated with) an input indicative of completion of work unit by the worker. For example, where the work unit is 10 kilograms of produce packed in a container, the configured processor determines at 114 whether a container comprising 10 kilograms of produce has been loaded into a receptacle by the worker, or into a receptacle proximate to the geographic location of the worker, and whether the total count of the discrete portions of the estimated physical movement attributes meets (matches) a threshold total amount of the work-pieces constituting completion of the work unit.

Thus, in response to a positive determination at 114 that the aggregation is linked to an input indicative of completion of work unit by the worker ("YES"), at 116 the configured processor credits the user with a compensation value of the completed work unit; otherwise ("NO"), the configured processor flags the completed work unit for denial of credit to the at 112; some embodiments audit movement attribute and work unit input data for further processing or consideration by a human resources or other management process (thus, to correct attribution of compensated work unit data to the worker, or to another worker, where warranted by the results of the audit).

While the embodiment of FIG. 1 includes the process at 114, other embodiments may omit this process and credit the user with a compensation value of the completed work at 116 in response to verifying that the aggregation of the matching labeled data sets meets the threshold for indication of completion of work unit at 110 ("YES").

Embodiments of the present invention solve problems with conventional processes and systems for determining work-piece completion, assessing the quality or quantity of the work product produced, and validating and associating the completed work amount to the person completing the work. For example, agricultural enterprises have problems in accurately tracking the activity and production of individuals ("workers") that they compensate (employees, independent contractors, etc.) for preforming services in handling agricultural products (pickers, harvesters, packers, planters, pruners, etc.) when the compensation is determined on a work-piece basis (number of items packed, loaded, planted, etc.) rather than on an hourly or other time-based method.

Agricultural workers are conventionally compensated on a work-piece rate, paid a fixed amount of currency or other compensation metric for each defined quantity of work-pieces planted, picked, packed, shipped, or baled, etc., wherein the quantity may be individually defined (for example, each piece of fruit), or defined by pluralities of units that fill a specified container (bucket, bin, basket, bushel peck, sack, etc.) or that meet an aggregate weight within some type of container (for example, a specified number of ounces, pounds, or kilograms). Problems arise with accurately determining the quantity of work-pieces processed (planted, picked, packed, etc.) by a given, individual agricultural worker, and thereby the correct compensation due to that worker. This problem is commonly caused, or exacerbated, when many other workers are simultaneously working in a same area and loading a same work unit into a same or similar container, which leads to mis-counting or to incorrectly attributing the processing of some work units to other workers.

Conventional processes and systems generally lack sufficiently accurate means for employers to track work units processed by a given worker in real-time, or to relay reported quantities of work units processed back to a manager on site for verification as the work is being performed, or for managers on-site to relay accurate numbers for each employee to off-site or remote payroll or other compensation organization in a quick, efficient, streamlined manner. Employers and compensation organizations may also receive data representing the quantities of work units processed in a variety of different standards and formats.

Accordingly, under conventional approaches some agricultural workers receive insufficient credit for work performed, penalizing the worker with lower compensation, while another worker may be unjustly awarded compensation for worker performed by another worker. Thus, some large employers of agricultural workers may report a wide variety in compensation amounts, and experience high counts of low wage earners relative to average or industry standards.

Embodiments of the present invention define and train the labeled physical movement data sets 105 to correlate to attributes of the physical movements of the worker when performing the compensated work, wherein data representing movements of the worker as reported by an activity tracker must be positively correlated with inputs of completed work products before the worker receives credit (compensation, etc.) for the work. This ensures that the worker is not unjustly enriched for work performed by another; and in the audit process at 112, triggers review of the motion tracker and work-piece input data to avoid undercounting and under-compensating the worker.

Figure 2:
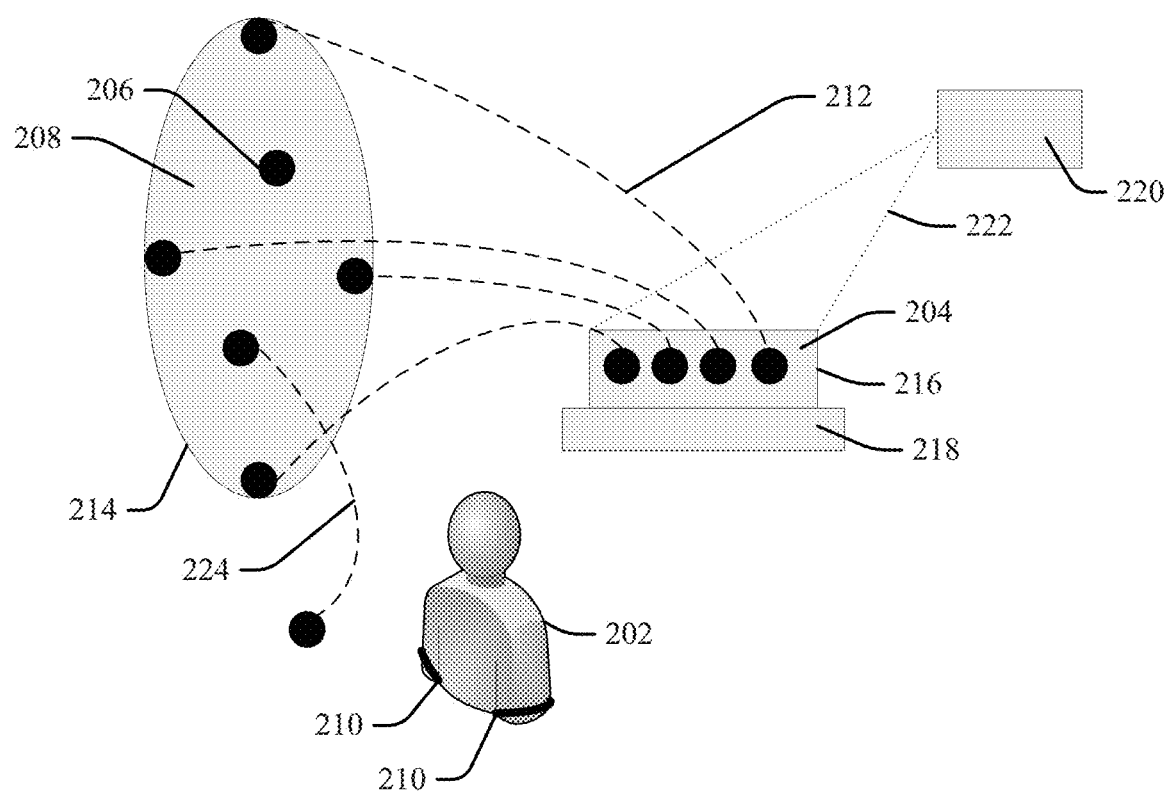
FIG. 2 is a graphic illustration of an example of an implementation according to the present invention.

FIG. 2 is a graphic illustration of an example implementation of the process or system of FIG. 1, wherein a worker 202 is compensated for each work unit defined as filling a carton 204 with fruit 206 picked from a sourcing tree 208 that is defined by a first geographic locational area defined relative to current position of the worker, as determined by geolocation components of (or a networked geolocation service in communication with) each of pair of wristband activity trackers 210 worn by the worker 202. The work unit is generated by the worker 202 picking individual ones of the fruit 206 from the tree 208 and depositing a plurality of the picked fruit 206 into the container 204 that is located (via the wristband activity trackers 210 geolocation components/ service) in a second "container" geographic location area 204 defined relative to the position of the worker 202 and the tree area 208 to aggregate into a specified quantity (weight, or volume needed to fill the container to a specified extent, etc.).

The labeled physical movement data sets (105) associated or linked to this compensated work unit comprise motion patterns 212 determined (generated) by the activity trackers 210 that show a motion initiating from within an outer boundary 214 defining the first (tree) geographic location 208 and ending within the outer boundary 216 of the second (container) area location 204. The aggregation threshold applied at 110 is a total number of the motion patterns 212 that equals (within a tolerance, for example, plus or minus 5% of the threshold, though other tolerance values will be apparent to one skilled in the art) a quantity of average or mean sizes of the picked fruit 206 that provides the specified quantity (the weight, or the volume needed to fill the container to the specified extent, etc.).

The process at 114 verifies that the aggregated motions 212 by the worker passing the determination at 110 are linked (proximate in time and/or location to the worker) to an input of a full container 204 of the fruit (for example, as determined by weight sensor 218 located under (relative to a direction of gravity) the container 204, or within range 222 of an optical sensor 220 that verifies fullness of the container from image data), wherein the compensation of the worker (at 116) is dependent on this verifying process at 114.

In the event that either verification process at 110 or 114 fails, auditing at 112 may comprise reviewing aggregated motion data and container fullness determinations inputs (by weight sensors, optical sensors, self-reporting inputs, etc.) that are linked or associated to other workers. Thus, the configured processor may determine in an audit process at 112 that the input of a full container by another (second) worker is not linked to a threshold number of motion data movements: for example, only thirty motions are detected by the second worker to fill a container with forty pieces of fruit. This may happen if the first worker mistakenly deposited picked fruit into the container of the second worker. In this case the configured processor may reward the first worker with a proportionate portion (25%) of the fill container input by the second worker, in response to determining that the motion data aggregated for the first worker exceeds the amount reflected in the container input by the first worker; that the motion data aggregated for the second worker does not match or support the amount reflected in the container input by the first worker; and that the respective motion patterns 212 of the first and second worker were proximate to each other in geographic location and time of generation. Thus, the present embodiment avoid underpayment to the first worker for work actually performed, wherein the worker would be improperly denied appropriate compensation under the conventional practice.

Embodiments of the present invention may customize and utilize electronic wristbands, employee ID scanner, and other activity tracking devices to define and track specific motion activities that are distinguished from other motion activity in a wide variety of implementations. Illustrative but not exhaustive examples include shipping and receiving activities (packing and unpacking containers); component assembly within or removal from a work-piece; sowing seed and planting plants; pruning and trimming plants; construction of brick and block walls, installing defined amounts of roofing and siding materials; and still other examples will be apparent to one skilled in the art.

Data processing according to the present invention mat be improved by adjusting tolerances for motion and completed unit data. Thus, with respect to the example of FIG. 2, only the motion patterns 212 that are tracked as initiating from within the tree 208 geographic location boundary 214 and end within the boundary 216 of the container 204 location are counted (aggregated), wherein other motion patterns 224 that fail to meet this locational or span of motion limitation are disregarded, avoiding false positives or noise inputs that would improperly increase work-piece loading motions used to for determining compensation for completion of the work unit.

The container input verification process at 114 avoids false positives or claims for compensation for motions that are not positively correlated to inputs of harvested fruit, wherein compensation can be positively tied to receipt of the specified quantity of work product, while the allocation of the compensation earned by the aggregate workpiece inputs are accurately allocated among a plurality of workers in proportion to motion data provided by their trackers: the workers 202 associated with the matched loading motions 212 that meet the boundary conditions for initiation and termination location are rewarded, and not those who may be present on-site but not actually demonstrated (via their motion pattern data) to be moving the work-pieces to the receiving containers.

Embodiments of the present invention increase payment efficiencies relative to conventional systems and processes. For example, aggregate numbers of buckets or weight of crop picked or packed and submitted as completed may be sent immediately and directly for preliminary approval to an on-site manager process, which may use verification processes according to the present invention (for example, at 110 and 112 of FIG. 1) to quickly approve compensation via a payroll process, centralizing managerial control inclusive of payroll and total output tracking based on aggregations of verified inputs or other completed unit metrics.

Feedback may be provided in real-time to the workers or managers, for example providing notice via the audit process at 112 of FIG. 1 that worker motion data is not matching submitted container data, thereby enabling the workers to correct any mistakes in submission or motion pattern detection while still on-site and working. These attributes of embodiments of the present invention enhance trust in the process by the worker and the manager and thereby improving perceived fairness and other positive qualities of the work place by workers and managers.

By utilizing automated processes to translate activity tracker representations of activities into working output data, embodiments deploy a multi-stage approval process that eliminates time and management effort inefficiencies in assessing and rewarding compensation to worker efforts. Embodiments may thus generate activity output standards that may be applied broadly across a variety of working environments, increasing human resource system reliability while defining worker accountability in objective processes that are inherently fairer and more reliable, and less susceptible to human bias, then conventional systems and processes that rely instead on qualitative assessments of worker performance by human managers.

Aspects of the present invention include systems, methods and computer program products that implement the examples described above. A computer program product may include a computer-readable hardware storage device medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic transmission waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
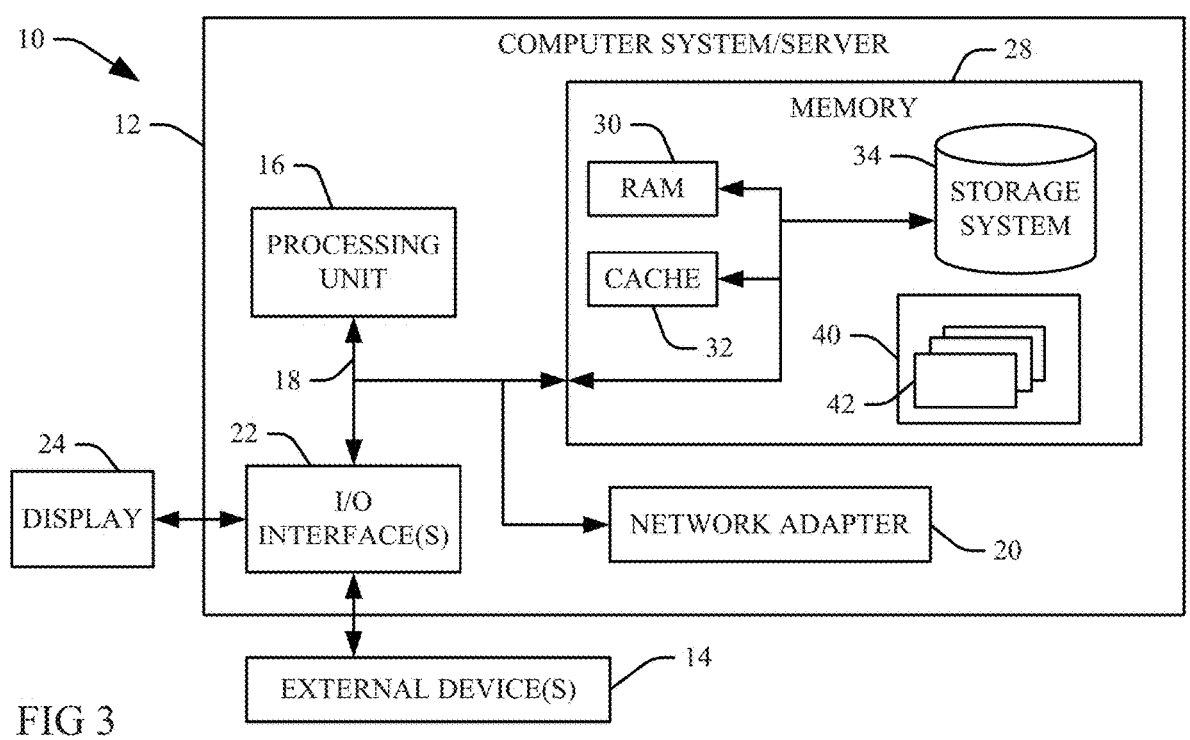
FIG. 3 depicts a computer device according to the present invention.

Referring now to FIG. 3, a computer system/server 12 is operational with numerous other computing system environments or configurations for tracking motions and other activities of a worker performing work-piece based compensation work according to the present invention. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In one aspect, a service provider may perform process steps of the invention on a subscription, advertising, and/or fee basis. That is, a service provider could offer to integrate computer-readable program code into the computer system/server 12 to enable the computer system/server 12 to track motions and other activities of a worker performing work-piece based compensation work as discussed in the Figures. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer-readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining whether a unique activity tracker is deployed and operational on a user while the user is within a threshold distance proximity to a work-piece receptacle during a defined working time period;
   estimating attributes of physical movement of the user from motion data acquired from the activity tracker while the user is within the threshold distance proximity to the work-piece receptacle during the defined working time period;
   comparing the estimated physical movement attributes to a knowledge base plurality of discrete data sets of motion attribute value that are labeled with specific physical movements;
   identifying each of a plurality of discrete portions of the estimated physical movement attributes that initiate from within a work-piece sourcing geographic location and end within a geographic location of the work-piece receptacle and match ones of the labeled data sets within the knowledge base that are associated to execution of a defined work unit that is associated to the work-piece receptacle during the defined working time period;
   in response to a notice of completion of the work unit by the user during the working time period, verifying whether an aggregation of the plurality of discrete portions of the estimated physical movement attributes meets a threshold requirement for indication of completion of the work unit by matching a total count of the discrete motions to a capacity count of the work-piece within the work-piece receptacle;
   automatically crediting the user with a compensation value of for completion of the work unit in response to verifying that the aggregation of the plurality of discrete portions of the estimated physical movement attributes matches the threshold requirement for indication of completion of the work unit and that the aggregation of the plurality of discrete portions is linked to a completion input that is indicative of completion of the work unit by the worker, wherein the completion input is a value that is selected from the group consisting of a total weight value of the work-pieces within the receptacle that meets a threshold indicative of completion of the work unit, and the capacity count of the work-piece within the work-piece receptacle;
   in response to verifying that the aggregation of the plurality of discrete portions of the estimated physical movement attributes does not match the threshold requirement for indication of completion of the work unit, determining a percentage of difference between the aggregation of the discrete portions of the estimated physical movement attributes and the threshold requirement; and
   automatically adjusting, as a function of the determined percentage, an amount of aggregation of a second plurality of discrete portions of the estimated physical movement attributes that are determined for crediting another user with the compensation value for completion of the work unit.

2. The method of 1, wherein the estimated physical movement attributes are selected from the group consisting of a geospatial body portion location, a direction of movement, a range of motion, and motion initiation and termination locations.

3. The method of claim 1, wherein the determining that the unique activity tracker is deployed and operational on the user while the user is within the threshold distance proximity to the workpiece receptacle during the defined working time period is selected from the group consisting of:
   receiving a device input from the user that is linked to a unique identity indicia of the user and the activity tracker during the defined working time period; and determining that the activity tracker communicates unique identity indicia to a receiving unit during the defined working time period while within the threshold distance proximity to the workpiece receptacle.

4. The method of claim 1, further comprising:
integrating computer-readable program code into a computer system comprising the processor, a computer readable memory in circuit communication with the processor, and a computer readable storage medium in circuit communication with the processor; and
wherein the processor executes program code instructions stored on the computer-readable storage medium via the computer readable memory and thereby performs the determining that the unique activity tracker is deployed and operational on the user, the estimating the attributes of physical movement of the user, the comparing the estimated physical movement attributes to the knowledge base plurality of discrete data sets of motion attribute value, the identifying each of the plurality of discrete portions of the estimated physical movement attributes that match ones of the labeled data sets within the knowledge base, the verifying whether an aggregation of the plurality of discrete portions of the estimated physical movement attributes meets a threshold requirement for indication of completion of work unit, and the crediting the user with the compensation value of for completion of the work unit.

5. The method of claim 4, wherein the computer-readable program code is provided as a service in a cloud environment.

6. A system, comprising:
a processor;
a computer readable memory in circuit communication with the processor; and
a computer readable storage medium in circuit communication with the processor; and
wherein the processor executes program instructions stored on the computer-readable storage medium via the computer readable memory and thereby:
determines whether a unique activity tracker is deployed and operational on a user while the user is within a threshold distance proximity to a work-piece receptacle during a defined working time period;
estimates attributes of physical movement of the user from motion data acquired from the activity tracker while the user is within the threshold distance proximity to the work-piece receptacle during the defined working time period;
compares the estimated physical movement attributes to a knowledge base plurality of discrete data sets of motion attribute value that are labeled with specific physical movements;
identifies each of a plurality of discrete portions of the estimated physical movement attributes that initiate from within a work-piece sourcing geographic location and end within a geographic location of the work-piece receptacle and match ones of the labeled data sets within the knowledge base that are associated to execution of a defined work unit that is associated to the work-piece receptacle during the defined working time period;
in response to a notice of completion of the work unit by the user during the working time period, verifies whether an aggregation of the plurality of discrete portions of the estimated physical movement attributes meets a threshold requirement for indication of completion of the work unit by matching a total count of the discrete motions to a capacity count of the work-piece within the work-piece receptacle;
automatically credits the user with a compensation value of for completion of the work unit in response to verifying that the aggregation of the plurality of discrete portions of the estimated physical movement attributes matches the threshold requirement for indication of completion of the work unit and that the aggregation of the plurality of discrete portions is linked to a completion input that is indicative of completion of the work unit by the worker, wherein the completion input is a value that is selected from the group consisting of a total weight value of the work-pieces within the receptacle that meets a threshold indicative of completion of the work unit, and the capacity count of the work-piece within the work-piece receptacle;
in response to verifying that the aggregation of the plurality of discrete portions of the estimated physical movement attributes does not match the threshold requirement for indication of completion of the work unit, determines a percentage of difference between the aggregation of the discrete portions of the estimated physical movement attributes and the threshold requirement; and
automatically adjusts, as a function of the determined percentage, an amount of aggregation of a second plurality of discrete portions of the estimated physical movement attributes that are determined for crediting another user with the compensation value for completion of the work unit.

7. The system of claim 6, wherein the estimated physical movement attributes are selected from the group consisting of a geospatial body portion location, a direction of movement, a range of motion, and motion initiation and termination locations.

8. The system of claim 6, wherein the processor executes the program instructions stored on the computer-readable storage medium via the computer readable memory and thereby determines that the unique activity tracker is deployed and operational on the user while the user is within the threshold distance proximity to the workpiece receptacle during the defined working time period by a process selected from the group consisting of:
receiving a device input from the user that is linked to a unique identity indicia of the user and the activity tracker during the defined working time period; and
determining that the activity tracker communicates unique identity indicia to a receiving unit during the defined working time period while within the threshold distance proximity to the workpiece receptacle.

9. A computer program product, comprising:
a computer readable storage medium having computer readable program code embodied therewith, wherein the computer readable storage medium is not a transitory signal per se, the computer readable program code comprising instructions for execution by a processor that cause the processor to:
determine whether a unique activity tracker is deployed and operational on a user while the user is within a threshold distance proximity to a work-piece receptacle during a defined working time period;
estimate attributes of physical movement of the user from motion data acquired from the activity tracker while the user is within the threshold distance proximity to the work-piece receptacle during the defined working time period;

compare the estimated physical movement attributes to a knowledge base plurality of discrete data sets of motion attribute value that are labeled with specific physical movements;

identify each of a plurality of discrete portions of the estimated physical movement attributes that initiate from within a work-piece sourcing geographic location and end within a geographic location of the work-piece receptacle and match ones of the labeled data sets within the knowledge base that are associated to execution of a defined work unit that is associated to the work-piece receptacle during the defined working time period;

in response to a notice of completion of the work unit by the user during the working time period, verify whether an aggregation of the plurality of discrete portions of the estimated physical movement attributes meets a threshold requirement for indication of completion of the work unit by matching a total count of the discrete motions to a capacity count of the work-piece within the work-piece receptacle;

automatically credit the user with a compensation value of for completion of the work unit in response to verifying that the aggregation of the plurality of discrete portions of the estimated physical movement attributes matches the threshold requirement for indication of completion of the work unit and that the aggregation of the plurality of discrete portions is linked to a completion input that is indicative of completion of the work unit by the worker, wherein the completion input is a value that is selected from the group consisting of a total weight value of the work-pieces within the receptacle that meets a threshold indicative of completion of the work unit, and the capacity count of the work-piece within the work-piece receptacle;

in response to verifying that the aggregation of the plurality of discrete portions of the estimated physical movement attributes does not match the threshold requirement for indication of completion of the work unit, determine a percentage of difference between the aggregation of the discrete portions of the estimated physical movement attributes and the threshold requirement; and automatically adjust, as a function of the determined percentage, an amount of aggregation of a second plurality of discrete portions of the estimated physical movement attributes that are determined for crediting another user with the compensation value for completion of the work unit.

10. The computer program product of claim 9, wherein the computer readable program code instructions for execution by the processor further cause the processor to select the estimated physical movement attributes from the group consisting of a geospatial body portion location, a direction of movement, a range of motion, and motion initiation and termination locations.

11. The computer program product of claim 9, wherein the computer readable program code instructions for execution by the processor further cause the processor to determine that the unique activity tracker is deployed and operational on the user while the user is within the threshold distance proximity to the workpiece receptacle during the defined working time period by a process selected from the group consisting of:

receiving a device input from the user that is linked to a unique identity indicia of the user and the activity tracker during the defined working time period; and determining that the activity tracker communicates unique identity indicia to a receiving unit during the defined working time period while within the threshold distance proximity to the workpiece receptacle.

* * * * *